Dec. 25, 1945.  W. C. COPE  2,391,550
COLLET CHUCK
Filed Nov. 15, 1943   2 Sheets-Sheet 1
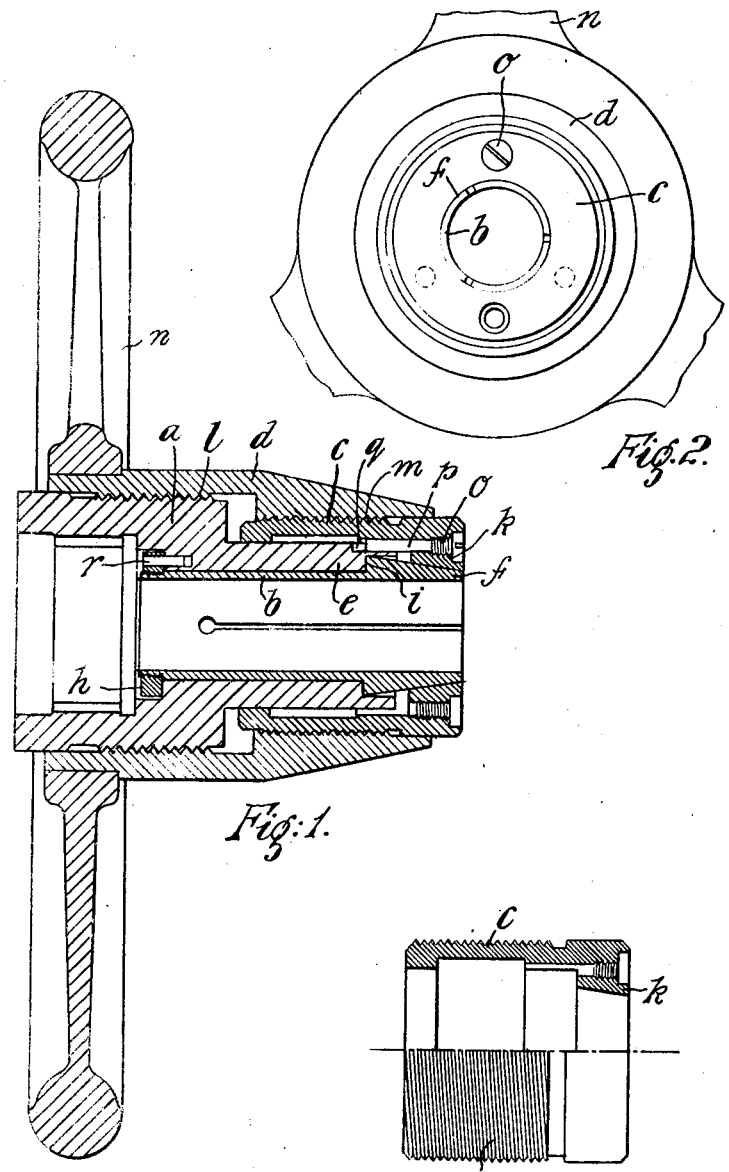

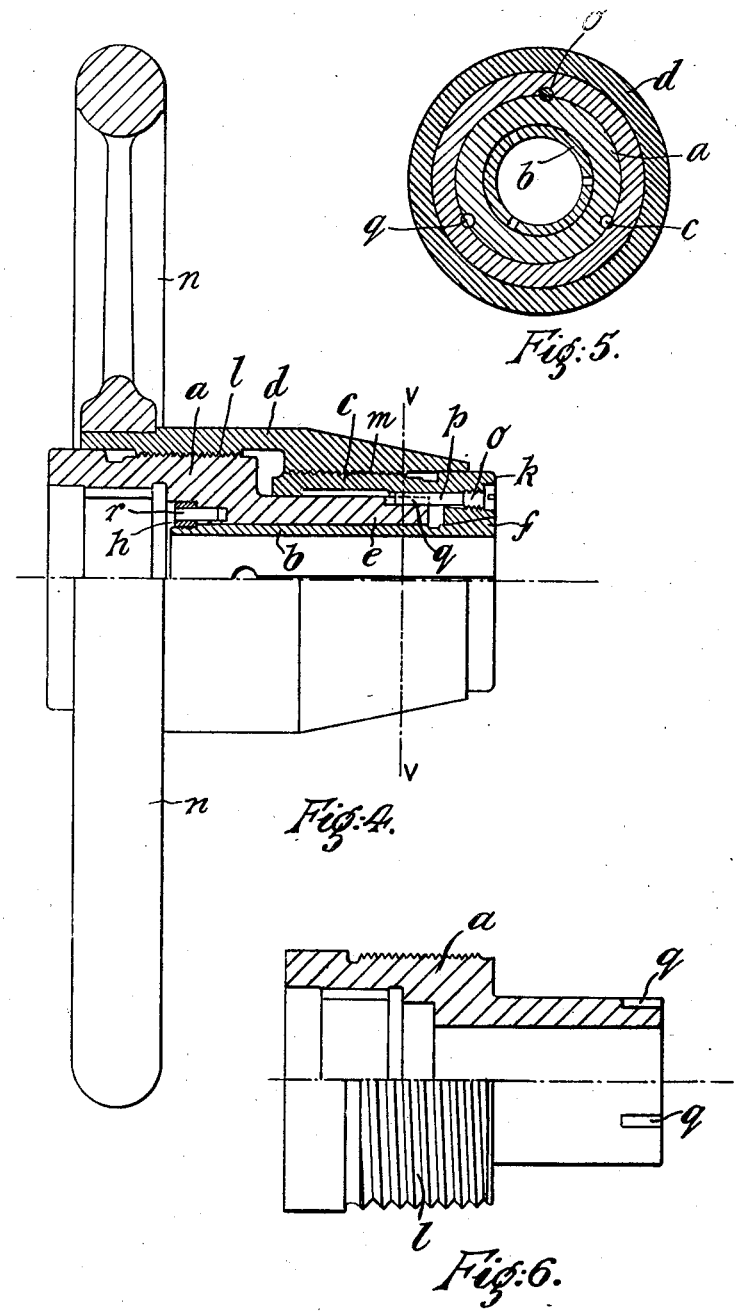

Patented Dec. 25, 1945

2,391,550

UNITED STATES PATENT OFFICE 2,391,550

COLLET CHUCK

Wilfrid Compton Cope, Whoberley, Coventry, England

Application November 15, 1943, Serial No. 510,391
In Great Britain March 27, 1943

2 Claims. (Cl. 279—50)

This invention relates to an improved collet chuck of the kind used in precision engineering for holding a tool or work-piece, and more particularly to the type in which the collet is split longitudinally and adapted for diametral contraction by means of co-operating inclined surfaces on the collet and on a sliding member arranged for axial movement relatively thereto.

The object of the invention is to provide an improved construction whereby a greater gripping power and precision is obtained than is possible with the orthodox type of collet chuck.

In a collet chuck of the kind herein referred to embodying the present invention the sliding member is operated to contract the collet by means of a locking sleeve having a differential screw threaded engagement with the said member and with the body of the chuck.

The collet is positively located in an axial direction and the sliding member is arranged to act on the outer end thereof.

In the accompanying drawings,

Figure 1 is a view in axial plane section of a collet chuck embodying the present invention.

Figure 2 is an end view as seen from the right-hand of Figure 1.

Figure 3 is a detail view partly in section of the sliding member.

Figure 4 is a view partly in side elevation and partly in axial plane section of an alternative construction of collet chuck embodying this invention.

Figure 5 is a cross-sectional view thereof on the line V—V of Figure 4.

Figure 6 is a detail view partly in section of the body of the chuck.

Referring to the drawings, $a$ represents the body of the chuck, $b$ the split collet, $c$ the sliding member and $d$ the locking sleeve.

The chuck body $a$, which is of cylindrical form, may either be adapted at one end for attachment to the spindle of the machine or tool bar, or made in one piece with said spindle or tool bar, and in each case has an open-ended axial socket $e$ to receive the split collet $b$. The outer end $f$ of the collet is of frusto-conical form with the apex directed either outwardly, as shown in Figure 1, or inwardly, as shown in Figure 4. The inner end of the collet is screw-threaded externally to receive a locating collar $h$. In the case where the apex of the coned end of the collet is directed outwardly, as seen in Figure 1, the outer end of the socket in the body is enlarged leaving a shoulder or abutment $i$ against which the base of the coned head of the collet is located axially. This is not necessary in the alternative case shown in Figure 4, the movement of the sliding member in contracting the collet being in this case in an outward direction. The inner end of the said socket in the body $a$ is enlarged to accommodate the collet retaining collar $h$ aforesaid.

The sliding member $c$ is mounted upon the body $a$ concentrically with the axis of the chuck and has its outer end $k$ coned internally, see Figure 3, for cooperation with the coned outer end of the collet $b$. The said sliding member and the rear or attachment end of the chuck body $a$ are each screw-threaded externally, the screw thread on the one part being of a slightly different pitch to that on the other part. In the form shown in Figure 1 the thread $l$ on the body will be coarser than that $m$ on the sliding member, but in the form shown in Figure 4 the reverse is the case. In either case the differential locking sleeve $d$ is similarly screw-threaded internally and adapted to screw onto the said body and sliding member. The said sleeve may be rotated either by hand or power in any suitable way, as by means of the hand wheel $n$. The arrangement is such that when the parts of the chuck shown in Figure 1 are assembled the effect produced on turning the locking sleeve $d$ in one direction about the axis of the chuck, is to draw the sliding member $c$ in an inwardly axial direction relatively to the collet $b$. In the construction shown in Figure 4 the effect would be to push the sliding member in an outwardly axial direction relatively to the collet. In either case the differential action of the screw threads combined with the co-action between the aforesaid coned surfaces on the collet and sliding member causes the latter to exert a contractible force about the coned outer end of the split collet, thereby causing the latter to engage the tool or work-piece inserted therein with a very powerful and uniform grip.

Rotation of the sliding member may be conveniently prevented by means of a key. For example, as shown in the drawings, a keyway screw $o$ adapted to engage either of two tapped holes in the said member is formed with an extension $p$ for engagement with any one of three registering keyways $q$ in the outer ends of the chuck body and sliding member thereby giving a vernier adjustment between the sliding member and the collet.

The collet itself may be prevented from turning in its socket by means of a suitably arranged peg, such as $r$ carried by the collar $h$ and engaging a hole in the body $a$, or in any other appropriate manner.

I claim:

1. A collet chuck comprising a chuck body having an axial bore, a collet located in said bore and comprising a tubular metal element slotted in its receiving end and having a frusto-conical face, said body having a large diameter externally screw-threaded rear portion and concentric therewith a reduced diameter front portion, in combination with an externally screw-threaded sliding member telescoped on the front portion of said body and having a complementary frusto-conical surface engaging said frusto-conical face, the threads on said body and the threads on said sliding member being of different pitch, a rotatable locking sleeve having internally screw-threaded portions respectively engaging and cooperating with the respective externally threaded portions of said body and said sliding member, means for preventing relative rotary movement between said collet and body, means for preventing relative rotary movement between said sliding member and body and for adjusting the angular position of said sliding member with respect to said body and said collet, and means carried by said collet and presented in the direction of its axis to an opposing axial face of said body to prevent axial movement of said collet relative to said body in the direction of axial thrust of said sliding member on the frusto-conical face of said collet incident to the closing of the collet about a tool or work-piece.

2. A collet chuck comprising a chuck body having an axial bore, a collet located in said bore and comprising a tubular metal element slotted in its receiving end and having a frusto-conical face, said body having a large diameter externally screw-threaded rear portion and concentric therewith a reduced diameter front portion, in combination with an externally screw-threaded sliding member telescoped on the front portion of said body and having a complementary frusto-conical surface engaging said frusto-conical face, the threads on said body and the threads on said sliding member being of different pitch, a rotatable locking sleeve having internally screw-threaded portions respectively engaging and cooperating with the respective externally threaded portions of said body and said sliding member, means for preventing relative rotary movement between said sliding member and body and for adjusting the angular position of said sliding member with respect to said body and said collet.

W. COMPTON COPE.